United States Patent [19]
Fitzgerald

[11] Patent Number: 5,640,695
[45] Date of Patent: Jun. 17, 1997

[54] MULTIBRANCHED SELECTIVELY COMBINED DIVERSITY CONTROLLER

[75] Inventor: Shane Fitzgerald, Long Beach, Calif.

[73] Assignee: ElectroCom Communication Systems L.P., Santa Fe Springs, Calif.

[21] Appl. No.: 259,257

[22] Filed: Jun. 14, 1994

[51] Int. Cl.$^6$ .................................................. H04B 7/08
[52] U.S. Cl. ......................... 455/134; 455/133; 455/226.2
[58] Field of Search ......................... 455/134, 132, 455/133, 135, 136, 140, 277.1, 277.2, 226.2, 307, 309; 364/724.19; 327/555; 73/650; 367/127

[56] References Cited

U.S. PATENT DOCUMENTS

| | | | |
|---|---|---|---|
| 4,539,710 | 9/1985 | Dinsmore | 455/134 |
| 4,659,995 | 4/1987 | Feistal | 327/555 |
| 4,924,497 | 5/1990 | Smith et al. | 379/150 |
| 5,051,703 | 9/1991 | Idogawa et al. | 455/309 X |
| 5,119,501 | 6/1992 | Perry et al. | 455/134 X |
| 5,253,531 | 10/1993 | Walker et al. | 73/650 |
| 5,291,519 | 3/1994 | Tsurumaru | 455/133 X |
| 5,321,668 | 6/1994 | Rouquette | 367/127 |
| 5,535,440 | 7/1996 | Clappier | 455/277.2 X |

*Primary Examiner*—Dwayne Bost
*Assistant Examiner*—Philip J. Sobutka
*Attorney, Agent, or Firm*—Harold E. Meier

[57] ABSTRACT

The present invention discloses an apparatus for minimizing the effects of destructive interference caused by multipath fading. An amplitude sensing module receives IF signals from a plurality of receivers and generates high speed voltage signals proportional to the logarithm of the amplitude of each of the IF signals. An analog logic module compares the high speed signals to each other to determine the high speed voltage signal having the greater level and actuates a switch to select the audio output from the receiver having the high speed signal with the higher voltage level. The switched audio output of the analog logic module is filtered by an output filter module to remove switching transients generated within the analog logic module. The filter module is programmable to accommodate various IF bandwidths and response characteristics.

28 Claims, 5 Drawing Sheets

MULTIBRANCHED SELECTIVELY COMBINED DIVERSITY CONTROLLER

TECHNICAL FIELD

This invention relates to the minimization of multipath fading, and more particularly to an apparatus using selectively combined diversity reception to overcome the destructive interference caused by multipath fading.

BACKGROUND OF THE INVENTION

As a user moves through a radio coverage area, severe amplitude fades are encountered at half wave length intervals. If the depth of these amplitude fades exceed the threshold level for reliable communications of a receiver, communications will fail. The effects of multipath fading are even more detrimental when transmitting high speed digital information over a fading channel.

Two common techniques for combatting multipath fading are Forward Error Correction (FEC) and Data Redundancies. FEC techniques append a block of message reconstruction information to each transmission. Should the transmitted message be received with errors, the reconstruction information enables reconstruction of the message at the receiver end. The problems with this approach include taxation of the processing power of a receiver due to the computationally intensive FEC techniques, and the reduction in system throughput caused by the additional FEC code added to each transmission.

Another method for reducing multipath fading uses data redundancies. In this simple scheme, each message is transmitted multiple times. A majority voting process at the receiving unit creates one good message out of several messages containing errors. This form of multipath interference reduction is less computationally intensive than FEC techniques and requires less processing time. However, multiple transmissions still cause a severe reduction in system throughput.

Both FEC and data redundancy techniques share the same two fundamental deficiencies in dealing with the destructive interference caused by multipath fading. First, both techniques are pro-active. Instead of eliminating multipath fading, the techniques focus on retrieving data once the damage has occurred. The other deficiency is that if a user is stationary and in a deep fade condition, no amount of FEC or redundant transmissions will enable communication.

By contrast, diversity reception is a method of reducing the destructive effects of multipath fading by addressing the problem more directly. Presently existing diversity reception techniques utilize multiple antennas or multiple receivers to recover modulated signals and require no FEC or data redundancy techniques. However, both the multiple antenna and multiple receiver techniques have been largely unsuccessful for a number of reasons.

In the multiple antenna scheme, a receiver has a plurality of antennas for receiving signals. In most multiple antenna schemes, a signal level threshold is set, and when a received signal from a particular antenna falls below the threshold, the receiver switches to another antenna in hopes of receiving a better signal. These schemes have been unsuccessful because of the impossibility of predicting the signal impressed on the unmonitored antennas. Thus, when switching from one antenna to another, no guaranty exists that another antenna will provide a better signal.

In a multiple receiver scheme, a plurality of receivers are available to supply recovered modulated signals. A composite received signal is assembled from each received signal using a combination or selection algorithm. This type of technically complex scheme has been largely unsuccessful due to the inadequacies of high speed RF signal level quantification circuitry and the inadequacies of the selection algorithm. Another problem with multi-receiver systems are the damaging transients resulting from high speed switching between phase discontinuous signals. Therefore, a need has arisen for a diversity reception system, capable of successfully reducing destructive interference caused by multipath fading.

SUMMARY OF THE INVENTION

The present invention overcomes the foregoing and other problems with a multibranched diversity controller. The controller is capable of minimizing the effects of multipath fading and comprises three main modules. An amplitude sensing module receives intermediate frequency (IF) signals from two or more receivers of a presently existing communication system. The IF signals are processed by an IF processor to generate a plurality of high-speed signals. Each of the high-speed signals is proportional to a corresponding received IF signal.

Each of these high-speed signals are transmitted to an analog logic module wherein the signals are compared to each other to determine the signal having the highest amplitude level. A selection signal indicating the signal having the highest amplitude level is generated in response to the comparison and used to actuate a switch within the analog logic module. The switch is connected to receive a plurality of audio signals from each of the receivers providing IF signals. The selection signal enables the switch to continuously select the audio output of the receiver having the highest voltage level.

The selected audio signal is filtered through an output filter module to remove high-speed switching transients caused by the switch of the analog logic module. The filter module is programmable to accommodate various IF bandwidths and response characteristics depending upon the needs of the associated communication system.

DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
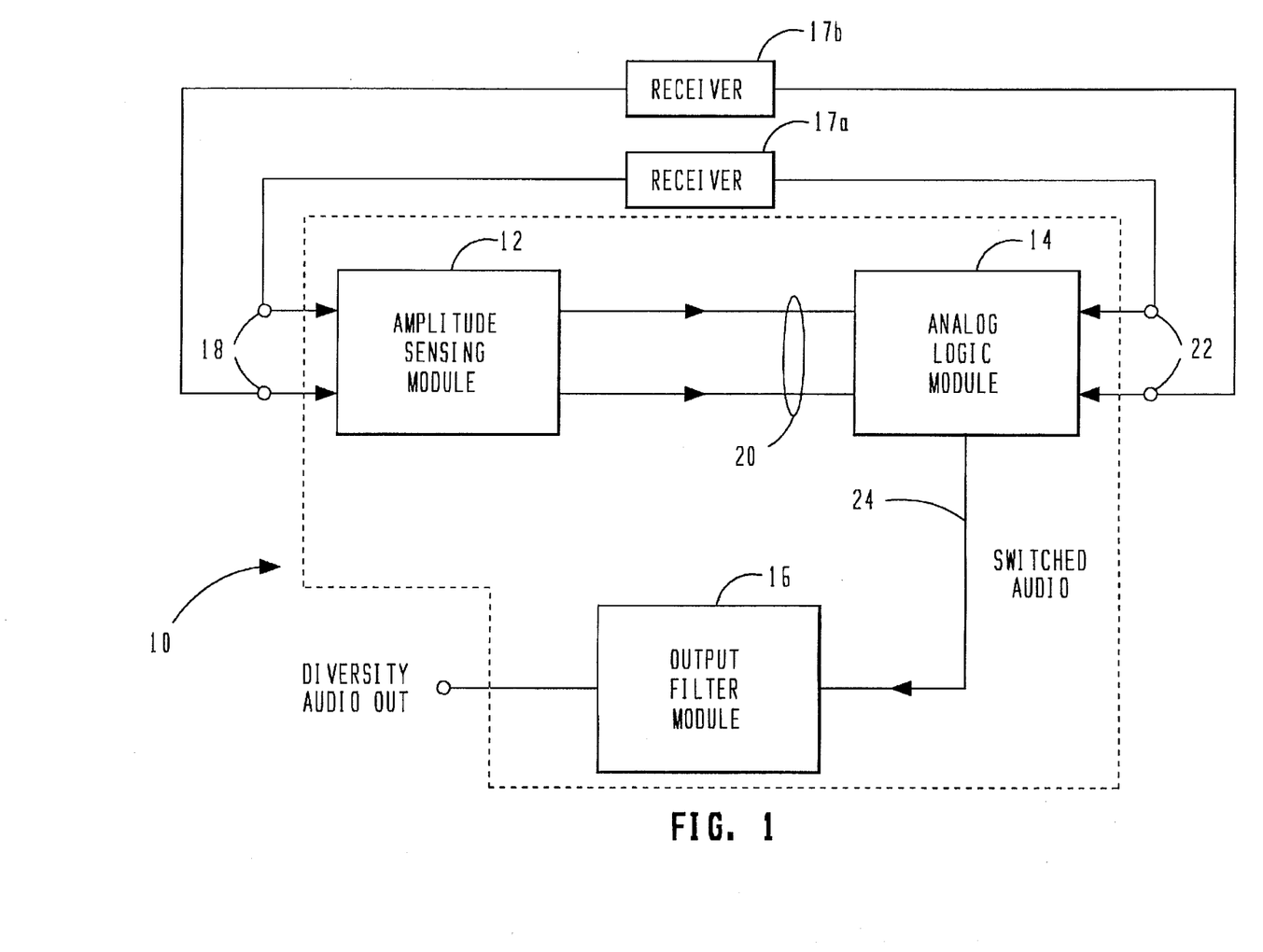
FIG. 1 is a block diagram of the two branch selectively combined diversity controller of the present invention.

Referring now to the Drawings, and more particularly to FIG. 1, there is illustrated a block diagram of the diversity reception controller 10. The controller 10 is configured such that it may be implemented in presently existing systems suffering from the problems of multipath fading. While the description of FIG. 1 and the following FIGURES has been made with respect to the use of only a pair of receivers, it is to be understood that multiple receivers may be used without departing from the spirit of the invention. The controller 10 is comprised of an amplitude sensing module 12, an analog logic module 14 and an output filter module 16. The amplitude sensing module 12 receives IF signals from a pair of receivers 17a and 17b over input ports 18. IF circuitry within the amplitude sensing module 12 analyzes the IF signals from each receiver 17a and 17b and generates a high speed DC voltage signal (RSSI voltage signal) proportional to the logarithm of the amplitude of the received signal levels of each receiver.

The RSSI voltage signals for each receiver 17a and 17b are transmitted over lines 20 to the analog logic module 14. Also connected to the analog logic module 14 are audio inputs from the receiver pair 17a and 17b through audio ports 22. The analog logic module 14 processes the RSSI voltage signals received over lines 20 and continuously selects the RSSI voltage signal having the highest relative signal strength and switches the audio input from the selected receiver to the switched audio output line 24.

The switched audio output line 24 connects the analog logic module 14 with the output filter module 16. The output filter module 14 comprises an eighth-order low-pass Bessel filter. The output filter module 16 receives the switched audio signals from the analog logic section 14 and filters the audio signal to remove any transients caused by high-speed switching within the analog logic module 14. The output filter module 16 provides a filtered diversity audio signal essentially free from any damaging effects of multipath fading.

Figure 2:
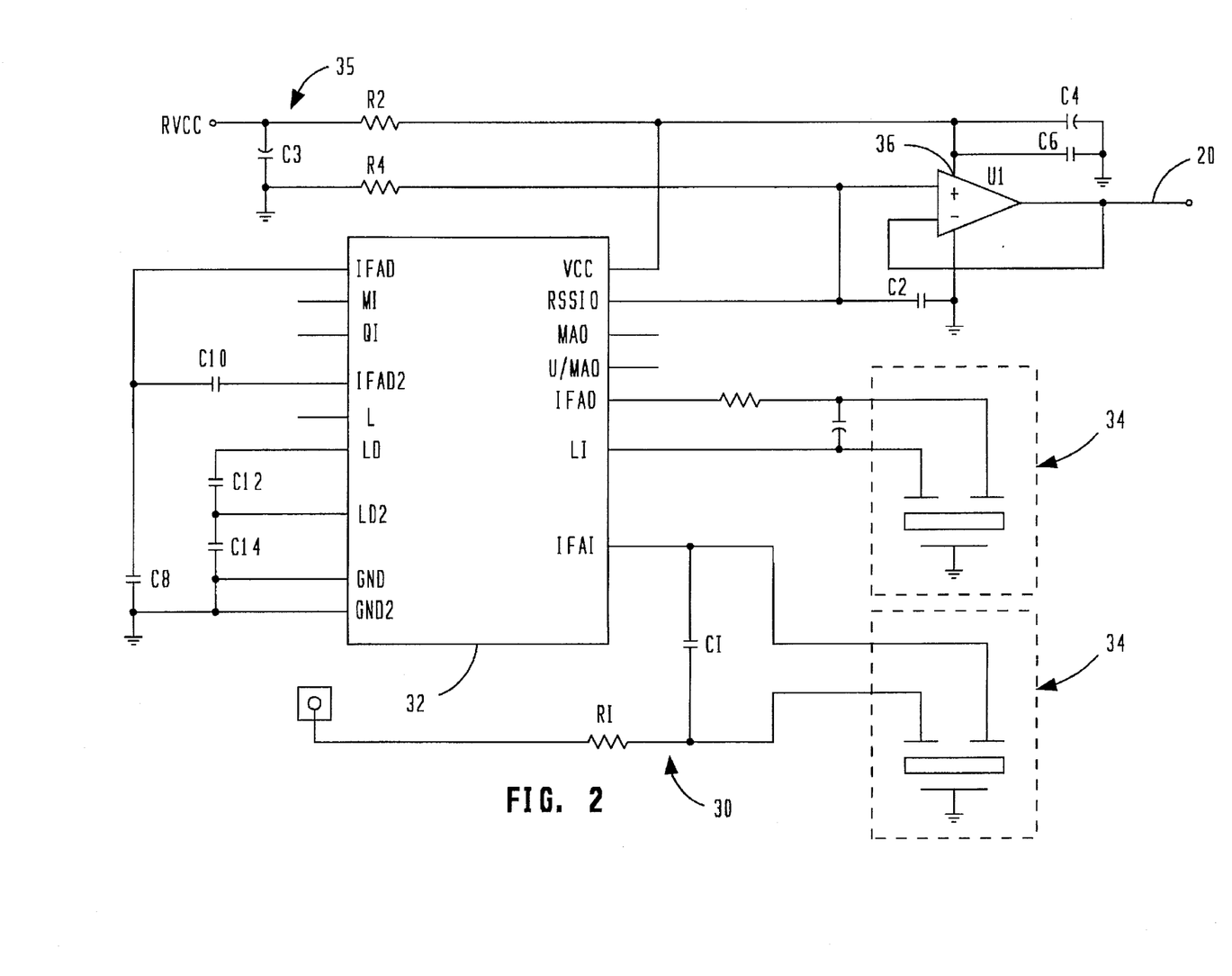
FIG. 2 is a schematic drawing of the amplitude sensing module.

Referring now to FIG. 2, there is illustrated a schematic drawing of the amplitude sensing module 12. It is noted that FIG. 2 only illustrates the sensing circuitry for one of the receivers. The amplitude sensing module 12 contains identical circuitry for processing IF signals from each receiver providing IF input to the module. The IF signal from a receiver 17a is applied to the IFAI pin of an integrated circuit IF processor 32 through a high pass filter 30, comprised of resistor R1 and capacitor C1. The integrated circuit IF processor 32 processes the IF amplitude information contained within the IF signal and generates a high-speed DC voltage signal, RSSI voltage signal, proportional to the logarithm of the IF signal amplitude over a wide dynamic range. The IF processor 32 outputs the RSSI voltage signal from pin RSSI 0.

The RSSI voltage signal is applied to the positive (+) input of an isolating unity gain amplifier U1 and grounded through capacitor C2. The buffered RSSI voltage signal at the output of the amplifier U1 is connected to the negative (−) input of the amplifier and transmitted through output line 20 for further processing. System power, RVCC, is provided to the power input 36 of amplifier U1 through a low pass filter 35 consisting of resistor R2 and capacitor C3. The power input 36 is also connected to ground through a parallel combination of capacitors C4 and C6. Pull-down resistor R4 is applied to the positive (+) input of amplifier U1.

Pin IFAD of the IF processor 32 is grounded through capacitor C8. Pin IFAD2 is grounded through a series combination of capacitors C10 and C8. Pin LD of IF processor 32 is grounded through capacitors C12 and C14. Pin LD2 is grounded through capacitor C14, and the GND and GND2 Pins are directly connected to ground. RVCC is applied to the IF processor 32 through low pass filter 35 to the RVCC Pin. Optionally, IF filters 34 are provided for systems requiring a high degree of selectivity. For example, systems utilizing adjacent RF channels.

Figure 3A:
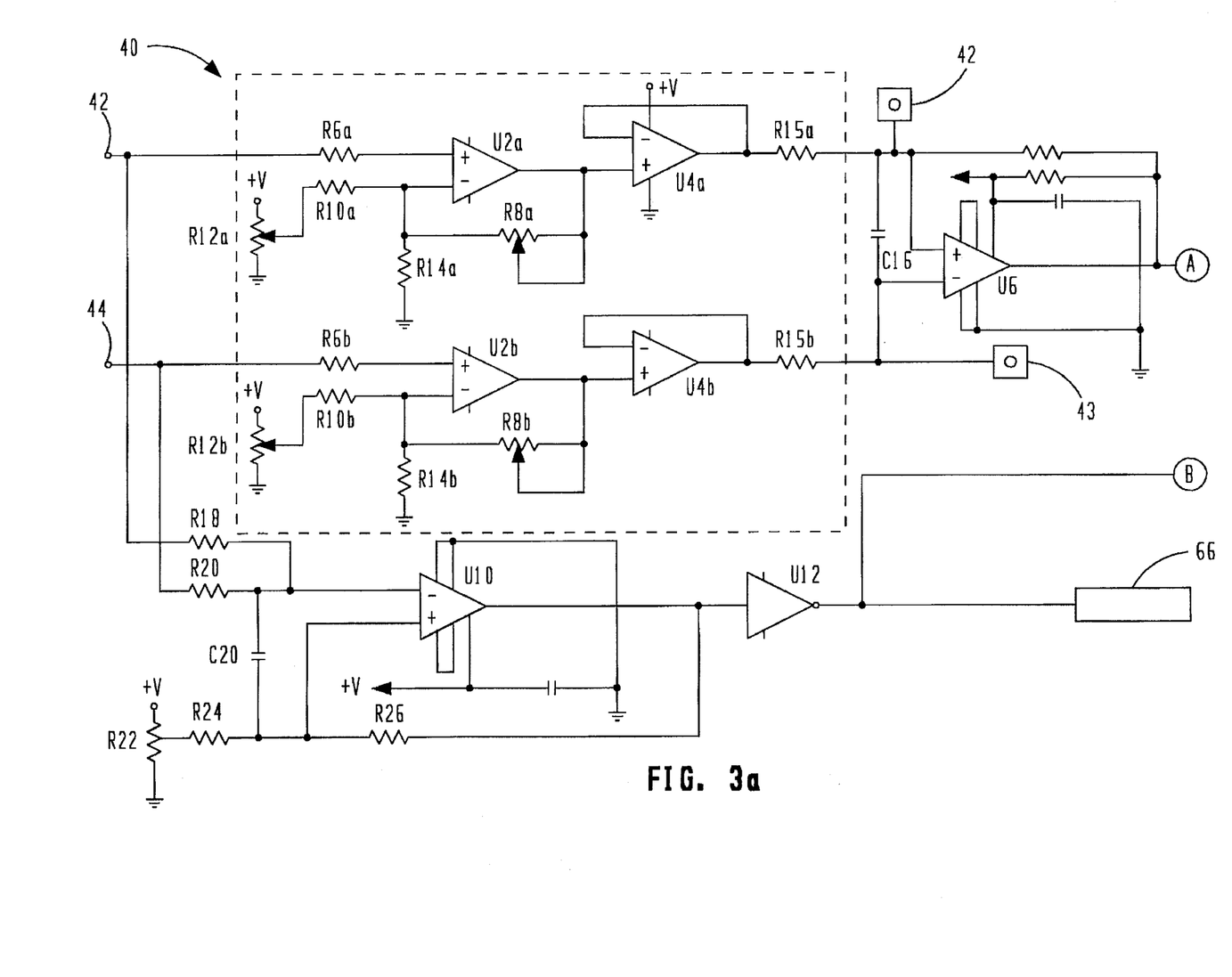
FIGS. 3a and 3b are a schematic drawing of the analog logic module.
Figure 3B:
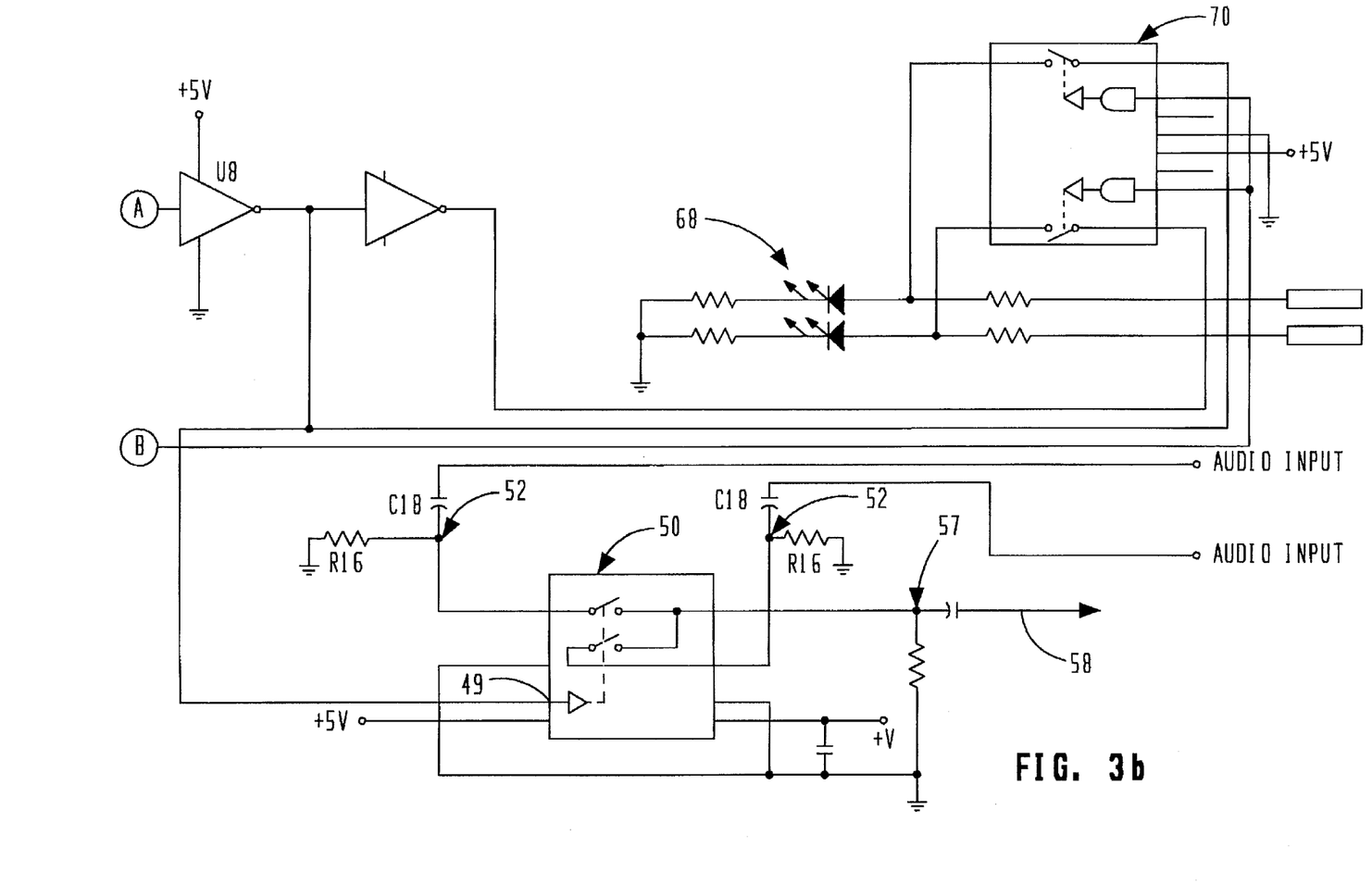

Referring now to FIGS. 3a and 3b, there is illustrated a schematic drawing of the analog logic module 14 of the present invention. The buffered RSSI voltage signals from the amplitude sensing module 12 are applied to level shifting circuitry 40 through input ports 42 and 44. The RSSI voltage signals are applied to the positive (+) input of level-shifting amplifiers U2a and U2b through resistors R6a and R6b, respectively. For ease of explanation, the remainder of the description of the level shifting circuitry 40 will be made with respect to a single receiver channel. However, it is to be understood that similar circuitry exists for each received RSSI voltage signal. Level shifting amplifier U2a amplifies the RSSI voltage signal to a desired voltage level. The desired voltage levels are achieved through an adjustable feedback loop connecting the output of amplifier U2a to the negative (−) input of the amplifier.

The adjustable feedback loop consists of variable resistor R8a connecting to the output of amplifier U2a and the negative (−) input of amplifier U2a. Further included in the feedback loop are resistor R10a and variable resistor R12a in series with each other and in parallel with resistor R14a connecting the negative (−) input of amplifier U2a to ground. Variable resistor R8a enables the RSSI differential voltage to be adjusted. Variable resistor R12a enables variable selection of the diversity selection threshold voltage. Thus, by altering the resistor values of variable resistors R8a and R12a, a desired level shifting amplification may be achieved. The level-shifted RSSI voltage signal is next applied to the positive (+) input of isolating unity gain amplifier U4a.

The level-shifted RSSI voltage signal from unity gain amplifier U4a is applied to the positive (+) input of precision voltage comparator U6 and to the negative (−) input of precision voltage comparator U6 through a capacitor C16 and resister R15a. The level-shifted RSSI voltage signal may also be accessed at output port 42. The level-shifted RSSI voltage signal from amplifier U4b is applied to the negative (−) input of the precision voltage comparator U6 through resister R15b and may be accessed at output port 43. The signal voltage comparator U6 determines which level shifted RSSI voltage signal has a greater voltage level and outputs a high/low logic level signal indicating the receiver having the highest voltage level and corresponding to the highest amplitude IF signal in response to the determination.

The logic level signal from the precision voltage comparator U6 is buffered and inverted at inverter U8, and the inverted signal is applied to the control port 49 of a high-speed CMOS single-pole dual-throw analog switch 50. Also connected to the CMOS switch 50 are audio signals from receiver 17a and receiver 17b through high pass filters 52, comprised of capacitors C18 and resistors R16. The signal received at the control port 49 actuates the switch to select the audio signal from the receiver having the highest IF amplitude signal at any particular point in time and transmits the selected audio signal to the output filter module 16 through high pass filter 57 via line 58.

The analog logic module 14 also generates a carrier detect signal by comparing the sum of both RSSI voltage signals received from the amplitude sensing module 12 to an adjustable threshold voltage. The carrier detect signal is generated by applying both RSSI voltage signals through resistors R18 and R20, respectively, to the negative (−) input of a precision voltage comparator U10. An adjustable threshold voltage is set utilizing a negative feedback loop consisting of variable resistor R22 in series with a resistor R24 connected to the positive (+) input of the voltage comparator U10 and resistor R26 connecting the output of precision amplifier U10 to the positive (+) input of the amplifier. A capacitor C20 is connected between the positive (+) and negative (−) inputs of amplifier U10. The output of the voltage comparator U10 is buffered and inverted by an inverter U12 and applied to a terminal block 66 for use by external devices. The output of the inverter U10 is also enables an on-board and remote visual selection indicators 68 by controlling the logic input of a dual-pole single-throw CMOS analog switch 70.

Figure 4:
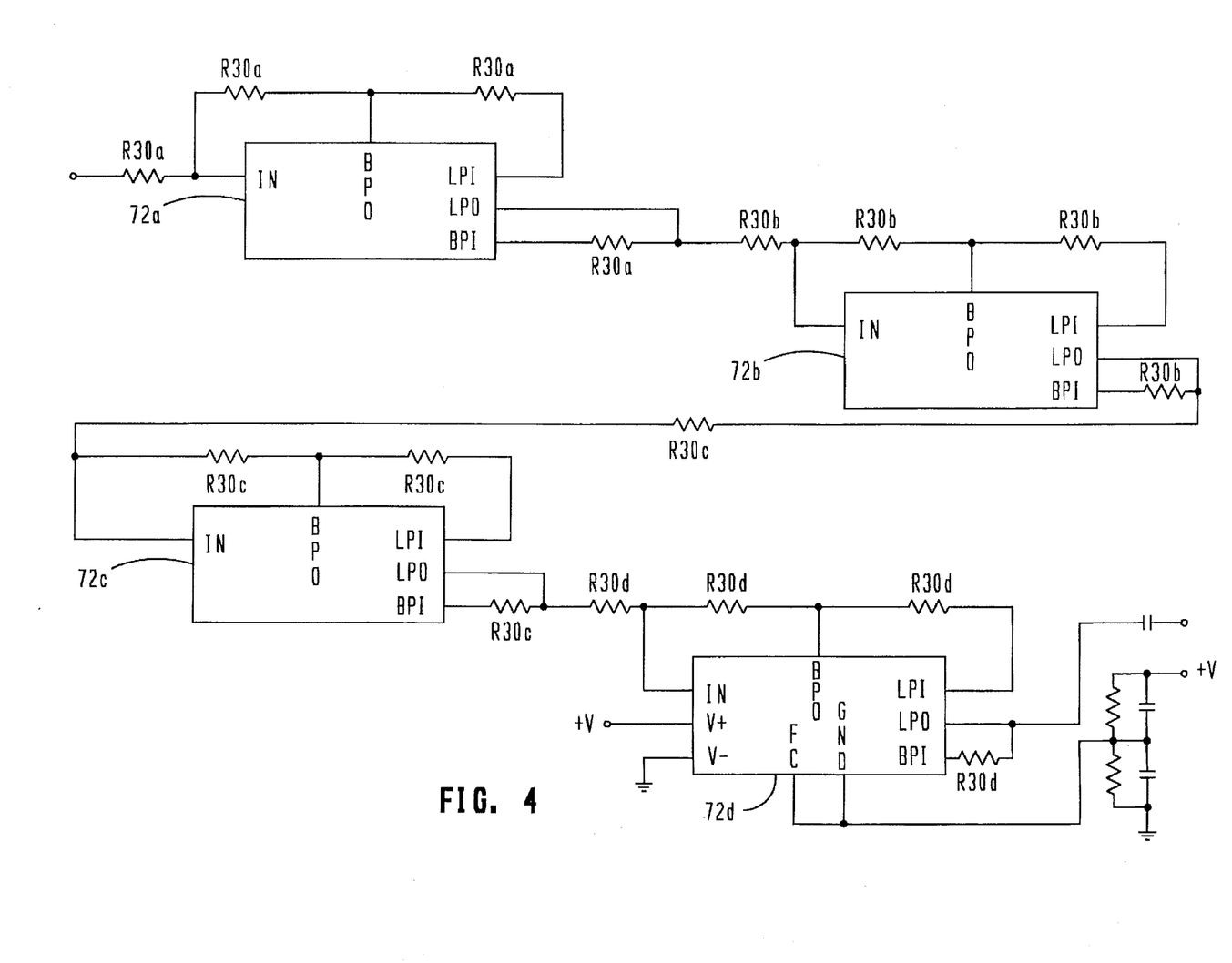
FIG. 4 is a schematic drawing of the output filter module.

Referring now to FIG. 4, there is illustrated a schematic drawing of the output filter module 16. The high-speed audio switching of the analog logic module 14 creates transients within the switched audio output signal of the analog logic module. The output filter module 16 comprises an eighth-order low-pass Bessel filter for filtering the transients from the switched audio signal caused by the high-speed switching between two phase discontinuous signals. The eighth-order low-pass Bessel filter insures constant input to output delays and fast settling characteristics.

The output filter module 16 is comprised of four independent cascaded second order filter sections 72. Each of the independent second-order filter sections 72 can implement any all-pole low-pass filter response, including Bessel, Butterworth and Chebyshev. The independent filter sections 72 are programmable via four external resistors R30 to the desired IF bandwidth and response characteristics. For data communications, the independent filters 72 are configured with a Bessel response to insure constant input to output delay and rapid settling characteristics. The output of the output filter module 16 is a two branch selectively combined diversity audio signal substantially free of multipath fading effects.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

I claim:

1. An apparatus for minimizing effects of multipath fading, comprising:
   an amplitude sensing module for receiving IF signals from a plurality of receivers each having and audio signal output and generating a plurality of high speed signals proportional to each of the IF signals; and
   a logic module connected to receive the plurality of high speed signals and the audio signals from each of the plurality of receivers, said logic module having a threshold level and selecting the high speed signal having the highest level when none of the high speed signals exceeds the threshold level, and when one or more of the high speed signals exceeds the threshold level, selecting any one of the high speed signals above the threshold level and maintaining the selection so long as the selected high speed signal remains above the threshold level, and outputting the audio signal of the receiver corresponding to the selected high speed signal.

2. The apparatus of claim 1, wherein the amplitude sensing module includes IF filters for filtering the received IF signals.

3. The apparatus of claim 1, wherein said logic module includes means for adjusting the threshold level.

4. The apparatus of claim 1, wherein the amplitude sensing module includes IF processors for genarating RSSI signals in response to the received IF signals.

5. The apparatus of claim 4, wherein the amplitude sensing module further includes isolating unity gain amplifier for buffering the generated RSSI signals.

6. The apparatus of claim 1, wherein the logic module further includes level shifting circuitry for converting the received high speed signals to a desired logic level signal.

7. The apparatus of claim 6, wherein the level shifting circuitry further includes:
   a level converter amplifier for amplifying the received high speed signal to a desired logic level; and
   an isolating unity gain amplifier for buffering the output of the level converter amplifier.

8. The apparatus of claim 7, wherein the level converter amplifier further includes means for selecting a diversity selection threshold voltage.

9. The apparatus of claim 7, wherein the level converter amplifier further includes means for expanding a differential voltage.

10. The apparatus of claim 1, wherein the logic module further includes a voltage comparator for comparing voltage levels of the received high speed signals to determine the selected high speed signal and generating an output in response thereto.

11. The apparatus of claim 10, wherein the logic module further includes a switch responsive to the output of the voltage comparator for selecting the audio signal of the receiver corresponding to the selected high speed signal.

12. An apparatus for minimizing effects of multipath fading, comprising:
   an amplitude sensing module for receiving IF signals from a plurality of receivers each having an audio signal output and generating for each of the received IF signals a high speed signal having a voltage level proportional to an amplitude of the IF signal;
   a voltage comparator for comparing voltage levels of each of the high speed signals, said voltage comparator having a threshold level and when none of the voltage levels exceeds the threshold level, generating an output representative of the high speed signal having the highest voltage level, and when one or more of the voltage levels exceeds the threshold level, generating an output representative of a selection of any one of the high speed signals having a voltage level above the threshold level and maintaining the generated output of the selected high speed signal so long as the voltage level of the selected high speed signal exceeds the threshold level; and
   a switch connected to receive audio signals from each of the plurality of receivers and responsive to the output of the voltage comparator for selecting the audio signal of the receiver corresponding to the high speed voltage signal represented by the output of the voltage comparator.

13. The apparatus of claim 12, wherein the amplitude sensing module further includes IF filters for filtering the received IF signals.

14. The apparatus of claim 12, wherein the amplitude sensing module includes IF processors for generating RSSI voltage signals in response to the received IF signals.

15. The apparatus of claim 14, wherein the amplitude sensing module further includes an isolating unity gain amplifier for buffering the generated RSSI voltage signals.

16. The apparatus of claim 12, wherein the amplitude sensing module further includes level shifting circuitry for converting the high speed signals to a desired logic level signal.

17. The apparatus of claim 16, wherein the level shifting circuitry further includes:
   a level converter amplifier for amplifying the received high speed signal to a desired logic level; and an isolating unity gain amplifier for buffering the output of the level converter amplifier.

18. The apparatus of claim 17, wherein the level converter amplifier further includes means for selecting a diversity selection threshold voltage.

19. The apparatus of claim 17, wherein the level converter amplifier further includes means for expanding a differential voltage.

20. A method for minimizing the effects of multipath fading in a communications system, comprising the steps of:

receiving a plurality of IF signals;

generating a plurality of high speed signals, each of the high speed signals having a voltage level proportional to one of the plurality of received IF signals;

generating a selection signal representing the high speed signal having the highest voltage level when none of the voltage levels exceeds a threshold level, and when one or more of the voltage levels exceeds the threshold level, generating a selection signal representing any one of the high speed signals above the threshold level and maintaining the generated selection signal so long as the voltage level of the any one selected represented high speed signal exceeds the threshold level; and selecting in response to the generated selection signal an audio signal corresponding to the high speed signal represented by the generated selection signal.

21. The method of claim 20, wherein the step of generating a plurality of high speed signals further includes the step of generating RSSI voltage signals.

22. The method of claim 20, wherein the step of generating a selection signal further includes the step of comparing the voltage levels of each of the plurality of high speed voltage signals.

23. The method of claim 20, wherein the step of selecting includes the step of actuating a switch connected to receive audio signals corresponding to each of the plurality of voltage levels to output the audio signal corresponding to the high speed signal represented by the generated selection signal.

24. The method of claim 20, further including the steps of:

comparing the sum of the high speed signals to a threshold voltage level;

generating a carrier detect signal in response to the comparison;

enabling on-board and remote visual selection indicators in response to the carrier detect signal.

25. An apparatus for minimizing effects of multipath fading, comprising:

an amplitude sensing module for receiving IF signals from a plurality of receivers each having an audio signal output and generating a plurality of high speed signals proportional to each of the IF signals;

a logic module connected to receive the plurality of high speed signals and the audio signals from each of the plurality of receivers for continuously selecting the high speed signal having a highest level and outputting the audio signal of the receiver corresponding to the selected high speed signal having the highest level said logic module further includes a comparator for comparing a sum of voltage level of the received high speed signals to an adjustable threshold voltage levels and generating a carrier detect signal in response to the comparison; and an output filter module for filtering high-speed switching transients from the selected audio signal.

26. The apparatus of claim 25, wherein the logic module further includes on-board and remote visual selection indicators responsive to the carrier detect signal.

27. An apparatus for minimizing effects of multipath fading, comprising:

an amplitude sensing module for receiving IF signals from a plurality of receivers each having an audio signal output and generating for each of the received IF signals a high speed signal proportional to an amplitude of the IF signal;

a voltage comparator for comparing voltage levels of each of the high speed signals to determine the voltage signal having the greater level and generating an output in response thereto;

a comparator for comparing a sum of voltage levels of the received high speed signals to an adjustable threshold voltage level and generating a carrier detect signal in response to the comparison;

a switch connected to receive audio signals from each of the plurality of receivers and responsive to the output of the voltage comparator for selecting the audio signal of the receiver corresponding to the high speed voltage signal having the greater level; and an output filter module for filtering high speed switching transients from the selected audio signal.

28. The apparatus of claim 27, further including on-board and remote visual selection indicators responsive to the carrier detect signal.

* * * * *

UNITED STATES PATENT AND TRADEMARK OFFICE
CERTIFICATE OF CORRECTION

PATENT NO. : 5,640,695
DATED : June 17, 1997
INVENTOR(S) : Shane Fitzgerald

It is certified that error appears in the above-indentified patent and that said Letters Patent is hereby corrected as shown below:

Column 3, line 20, "output filter module 14" should be --output filter module 16--.

Column 5, line 4, "U10 is also enables" should be --U10 also enables--.

Column 5, line 41, "having and audio" should be --having an audio--.

Signed and Sealed this

Tenth Day of February, 1998

BRUCE LEHMAN

Attest:

Attesting Officer

Commissioner of Patents and Trademarks